United States Patent [19]

Hamaguchi

[11] Patent Number: 5,276,805
[45] Date of Patent: Jan. 4, 1994

[54] IMAGE FILING SYSTEM WHICH HAS RETRIEVAL DATA CONTAINING LINK INFORMATION BETWEEN IMAGE DATA

[75] Inventor: Akira Hamaguchi, Kanagawa, Japan

[73] Assignee: Fuji Photo Film Co., Ltd., Kanagawa, Japan

[21] Appl. No.: 530,512

[22] Filed: May 30, 1990

[30] Foreign Application Priority Data

May 30, 1989 [JP] Japan .................. 1-137775

[51] Int. Cl.$^5$ ............................................ G06F 15/20
[52] U.S. Cl. ................................. 395/164; 395/600
[58] Field of Search .............. 395/164, 166, 600, 162; 340/721, 799, 750, 800

[56] References Cited

U.S. PATENT DOCUMENTS

| | | | |
|---|---|---|---|
| 4,545,068 | 10/1985 | Tabata et al. | 395/164 |
| 4,574,364 | 3/1986 | Tabata et al. | 340/721 |
| 4,716,404 | 12/1987 | Tabata et al. | 395/164 |
| 4,749,990 | 6/1988 | Birkner | 340/799 |
| 4,752,910 | 6/1988 | Yen et al. | 395/600 |
| 4,809,214 | 2/1989 | Shimakura | 395/600 |
| 4,918,588 | 4/1990 | Barrett et al. | 395/600 |
| 4,922,437 | 5/1990 | Sakata et al. | 364/514 |
| 4,942,479 | 7/1990 | Kanno | 358/448 |
| 4,945,499 | 7/1990 | Asari et al. | 395/164 |
| 4,996,664 | 2/1991 | Fujiwara et al. | 395/600 |
| 5,093,911 | 3/1992 | Parks et al. | 395/600 |

FOREIGN PATENT DOCUMENTS 62-271187 11/1987 Japan .
63-6664 1/1988 Japan .
63-18436 1/1988 Japan .

Primary Examiner—Dale M. Shaw
Assistant Examiner—Kee M. Tung
Attorney, Agent, or Firm—Sughrue, Mion, Zinn Macpeak & Seas

[57] ABSTRACT

An image filing system has first and second image storage devices and a retrieval data storage device. Image data representing a plurality of images are stored in the first image storage device, and retrieval data corresponding to the image data are stored in the retrieval data storage device. Desired image data are specified according to the corresponding retrieval data, and retrieved from the first image storage device and outputted to the second erasable random-access image storage device. Link information which indicates other image data related to the specified image data is added to the retrieval data. When desired image data are specified according to the corresponding retrieval data and retrieved and outputted to the second image storage device, the other image data related to the desired identified image data can quickly and efficiently be retrieved according to the link information.

2 Claims, 3 Drawing Sheets

FIG.2

| | 1 | 2 | 3 | 4 | 5 | 6 a | 6 b |
|---|---|---|---|---|---|---|---|
| A | A 1 | A 2 | A 3 | A 4 | A 5 | A 6 a | A 6 b |
| B | | | | | | | |
| C | | | | | | | "D" |
| D | | | | | | "C" | |
| X | | | | | | | |
| Y | | | | | | | |
| Z | | | | | | | |

IMAGE FILING SYSTEM WHICH HAS RETRIEVAL DATA CONTAINING LINK INFORMATION BETWEEN IMAGE DATA

BACKGROUND OF THE INVENTION

The present invention relates to an image filing system for storing image data such as medical image data retrievably in a storage medium, and more particularly to an image filing system which has retrieval data containing link information between image data representative of a plurality of images, the image filing system allowing the image data to be selected according to the link information and to be transmitted to an output device such as a display unit or a printer.

Many medical images, i.e., images containing medical information of patients' bodies, are widely used for medical treatment and research activities in medical and clinical organizations such as hospitals. Most of such medical images are radiation images, but more and more CT (computer tomography) images and MRI (magnetic resonance imaging) images recently as medical images. These medical images are stored as records of patients' conditions and accessed for diagnosis, when necessary. The medical images are legally required to be kept for a certain period of time. As a result, the number of medical images stored in medical and clinical organizations grows day by day.

Heretofore, medical images have been stored as hard copies. It has been a burdensome task for medical and clinical organizations to have a sufficient storage space for medical images, to keep stored medical images in order, and to access and retrieve desired images. Recently, there has been proposed an electronic image filing system for storing medical images as image data retrievably in a mass storage device such as an optical disk, as disclosed in Japanese Laid-Open Patent Publications Nos. 63(1988)-18436 and 63(1988)-6664. The electronic image filing system reduces the space and labor needed to store medical images, and allows stored images to be accessed and retrieved easily and quickly.

The electronic image filing system has a data base including stored image data and retrieval data, such as patients' information and imaging information, corresponding to the stored image data. Desired image data can be accessed and retrieved according to corresponding retrieval data. The image data are usually stored in an optical disk which has a very large storage capacity because even a single image contains a great amount of image data. However, since the amount of retrieval data is relatively small as compared with the image data, the retrieval data are usually stored in a high-speed storage device such as a magnetic disk, so that any desired image data can quickly be retrieved according to corresponding retrieval data.

Generally, many different medical images are taken of different body regions at different times or dates under different imaging conditions for one individual or patient. In order to successively display related ones of these medical images for comparison, an electronic image filing system should efficiently retrieve and output those related medical images. In view of such a demand for high-speed retrieval and output capability, there has been proposed an image filing system which transfers image data from an optical disk to a magnetic disk or the like that can be accessed at high speed, and then reads an image from the magnetic disk for output. For example, Japanese Laid-Open Patent Publication No. 62(1987)-271178 discloses an image filing system in which a particular image is retrieved and outputted and a plurality of images that precede and follow the particular image are also transferred to a magnetic disk or the like.

The disclosed image filing system is effective in use if related images are successively recorded, but ineffective if related images are recorded at random. In large-scale hospitals or other medical and clinical organizations, various body regions of several hundred patients are imaged and stored in an optical disk in one day. It is very rare for related images of a particular patient to be recorded in successive storage locations in the optical disk. Therefore, related images of a particular patient cannot usually be retrieved at high speed by the above disclosed image filing system.

SUMMARY OF THE INVENTION

It is a major object of the present invention to provide an image filing system in which image data representing a plurality of images are stored in a first image storage device, retrieval data corresponding to the image data stored in the first image storage device are stored in a retrieval data storage device, and desired image data are specified according to the corresponding retrieval data, and retrieved from the first image storage device and outputted to a second erasable random-access image storage device, the image filing system having means for adding, to the retrieval data corresponding to the respective image data, link information which indicates other image data related to the specified image data, so that when desired image data are specified according to the corresponding retrieval data and retrieved and outputted to the second image storage device, the other image data related to the desired identified image data can quickly and efficiently be outputted.

Another object of the present invention is to provide an image filing system comprising a first image storage device for storing image data representing a plurality of images, a second erasable random-access image storage device for storing image data, retrieval data storage device for storing retrieval data corresponding to the image data stored in the first image storage device, the retrieval data including storage location information of the image data in the first image storage device and key information to retrieve the image data, and processing means for specifying image data according to corresponding retrieval data, and for either reading the specified image data from the first image storage device for reproduction, or transferring the specified image data from the first image storage device to the second image storage device and reading the transferred specified image data from the second image storage device for reproduction, wherein the processing means includes a first means for adding link information to the retrieval data representing other image data related to the specified image data and a second means for determining the image data related to the specified image data according to the link information and transferring the determined image data from the first image storage device to the second image storage device.

Still another object of the present invention is to provide an image filing system wherein the link information includes first link data for specifying related image data recorded prior to the specified image data and second link data for specifying related image data recorded subsequently to the specified data.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a diagram showing retrieval data to be stored in a magnetic disk device.

DETAILED DESCRIPTION OF THE PREFERRED EMBODIMENT

Figure 1:
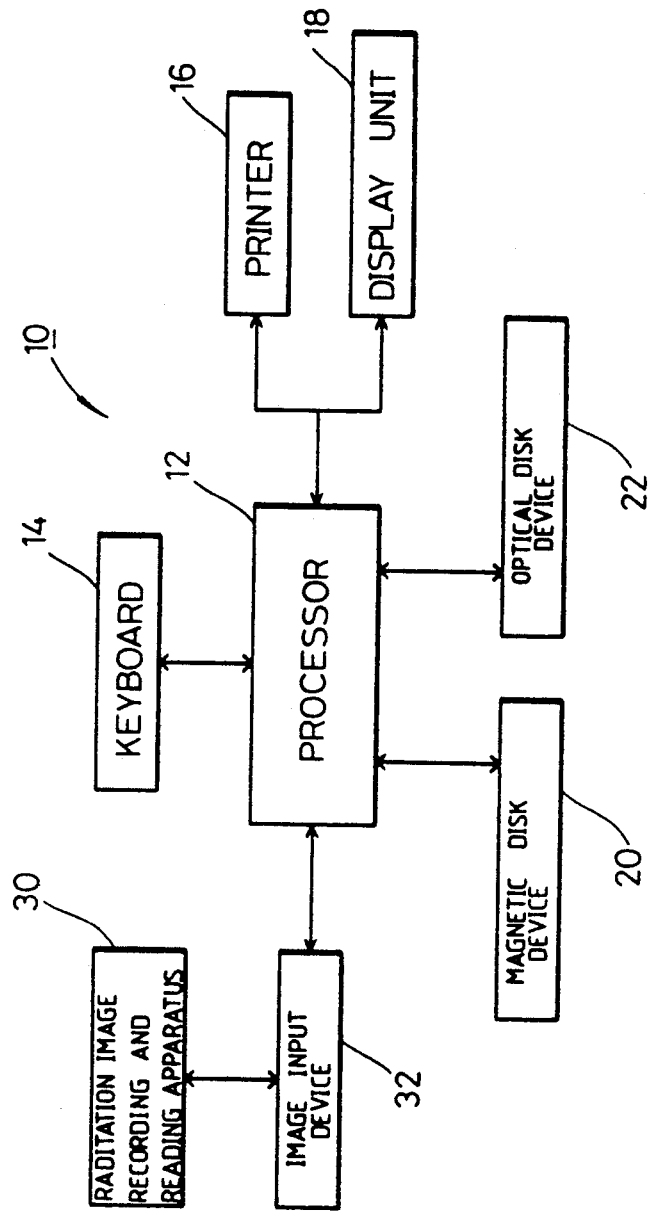
FIG. 1 is a block diagram of an image filing system according to the present invention.

FIG. 1 shows in block form an image filing system 10 according to the present invention. The image filing system 10 basically comprises a processor 12, a printer 16 as an output device, a display unit 18 as another output device, a keyboard 14 for entering retrieval data, an optical disk device (first image storage device) 22 for storing image data, a magnetic disk device (second image storage device and retrieval data storage device) 20 for storing retrieval data and image data, and an image input device 32. The image input device 32 is supplied with image data from a radiation image recording and reading apparatus 30 as an image data supply source. The image input device 32 processes the supplied image data and transmits the processed image data, together with patient information such as a patient's name and imaging information such as an imaged region, to the processor 12.

The magnetic disk device 20 and the optical disk device 22 are connected to the processor 12. The image data are stored in the optical disk device 22. The patient's information and imaging information, which correspond to the image data, and a directory (storage location information) of the image data stored in the optical disk device 22, are stored as retrieval data in the magnetic disk device 20.

The keyboard 14, the printer 16, and the display unit 18 are also connected to the processor 12. A desired retrieval condition is entered by the operator from the keyboard 14 into the processor 12. When the retrieval condition is entered, the processor 12 browses the retrieval data stored in the magnetic disk device 20, and retrieves and outputs the retrieval data, such as patient's information and imaging information for the images corresponding to the retrieval condition, to the display unit 18. The operator then specifies a desired image based on the retrieval data displayed on the display unit 18. When a desired image is specified, the operator sends a selection signal from the keyboard 14 to the processor 12, which then accesses the optical disk device 22 and either displays the image data indicated by the directory in the selected retrieval data on the display unit 18 or records the image data as a hard copy on the printer 16.

If there are also stored a series of image data related to certain image data, i.e., a series of image data indicating the same body region of the same patient as, and produced at different times or dates from, the certain image data, then the processor 12 is instructed to execute a linking process (described below) so that those related image data can be accessed at high speed. More specifically, link information is added to the respective retrieval data corresponding to those related image data, and the retrieval data with the added link information are stored in the magnetic disk device 20. For retrieval of desired image data, a linked output instruction is given to the processor 12 to read any related image data which are linked to the desired image data by link information, i.e., to output linked image data. If there is link information in the retrieval data corresponding to desired image data when the desired image data are retrieved, then the processor 12 reads the retrieval data corresponding to the related image data linked by the link information, and obtains the directory of the related image data in the optical disk device 22 from the retrieval data. Based on the obtained directory, the processor 12 reads the related image data from the optical disk device 22 and temporarily stores the related image data in the magnetic disk device 20.

The image filing system thus constructed operates as follows:

As shown in FIG. 1, an image recording sheet such as a stimulable phosphor sheet, for example, is fed into a position which confronts an exposure table in the radiation image recording and reading apparatus 30. Then, a radiation emitted by a radiation source is applied to a patient held against the exposure table, and a transmitted-radiation image of the patient is recorded in the stimulable phosphor sheet. The stimulable phosphor sheet with the recorded radiation image is two-dimensionally scanned by a laser beam emitted from a laser beam source in an image reading device. Upon application of the laser beam as stimulating light, the stimulable phosphor sheet emits light representing the radiation image, and the emitted light is led through a light guide to a light detector such as a photomultiplier, which photoelectrically detects the light. An analog output signal from the light detector is then amplified and converted into digital image data which bears the radiation image of the patient. The digital image data are transmitted from the radiation image recording and reading device 30 to the image input device 32 in which the digital image data are subjected to gradation processing, frequency processing, etc. The processed digital image data are then transmitted to the processor 12.

The radiation image recording and reading apparatus 30 has an ID terminal (not shown) which reads various items of patient's information, such as the name, the date of birth, etc., of the patient, which are recorded in an ID card of the patient. The operator enters, from the radiation image recording and reading apparatus 30, various items of imaging information relative to the recorded radiation image, such as the image number, the date of the image, the imaged body region, the size of the image, the reading sensitivity, etc. The patient information and the imaging information are transmitted, together with the digital image data, from the radiation image recording and reading apparatus 30 through the image input device 32 to the processor 12.

Storage and retrieval of the image data under the control of the processor 12 will be described below.

When the patient's image data produced by the radiation image recording and reading apparatus 30 and the patient information and the imaging information are transmitted to the processor 12, the processor 12 stores the image data in the optical disk device 22. The patient information and the imaging information may also be stored as a header of the image data in the optical disk device 22. A directory which indicates the storage location of the image data stored in the optical disk device 22, as well as the patient information and the imaging information, are edited as retrieval data corresponding to the image data in the processor 12, and then stored in the magnetic disk device 20.

Figure 2:
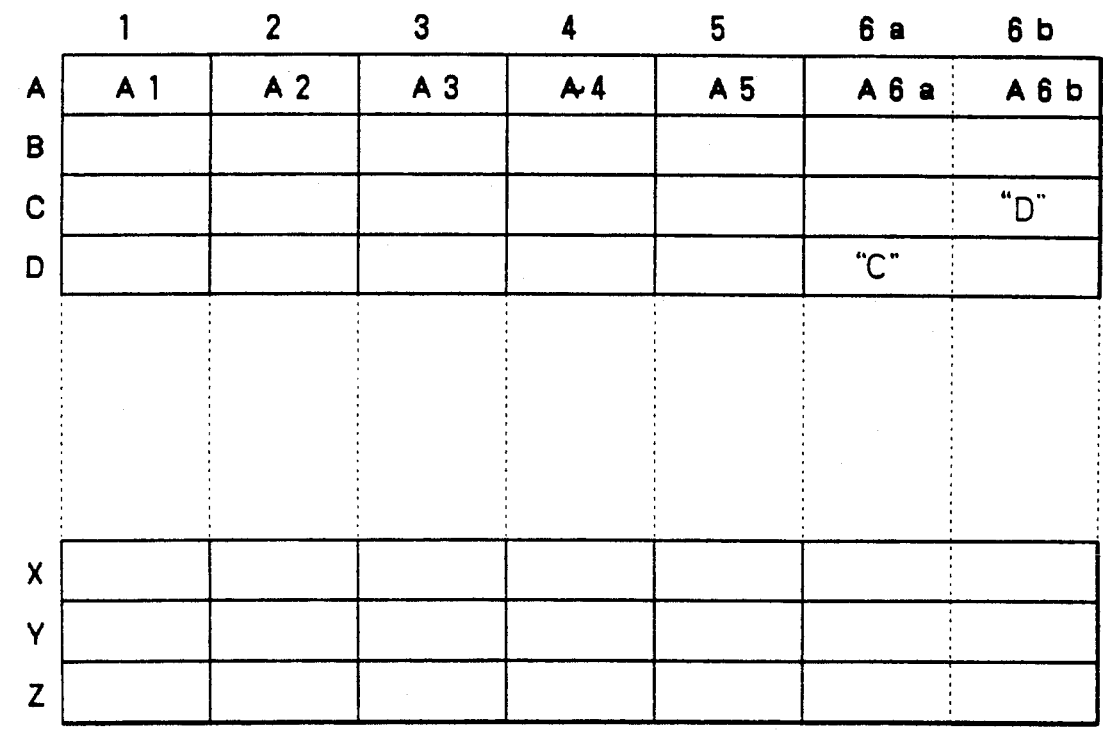

FIG. 2 illustrates the structure of the retrieval data stored in the magnetic disk device 20. Denoted at A through Z are retrieval data corresponding to respective image data, and 1 through 5 and 6a, 6b are regions of the retrieval data with respect to the respective image data. The region 1 indicates the date of the image, the region 2 the imaged body region, the region 3 the image number, the region 4 the directory (storage location information) of the image data in the optical disk device 22, the region 5 the patient code, and the regions 6a, 6b link information indicative of related images.

For example, the retrieval data corresponding to image data A are composed of image date "A1", imaged body region "A2", image number "A3", directory "A4", patient code "A5", and link information "A6a", "A6b". The link information "A6a" comprises first link data representing the image number (in the region 3) of related image data which are recorded prior to the image data A. The link information "A6b" comprises second link data representing the image number of related image data which are recorded subsequently to the image data A. The link information is transmitted from the processor 12 and stored in the magnetic disk device 20 according to a procedure described later on. The directory "A4" of the image data A in the optical disk device 22 is set up by the processor 12 when the image data A are stored in the optical disk device 22, and is stored as part of the retrieval data in the magnetic disk device 20.

Link information between related image data is stored in the magnetic disk device 20 as follows:

When new image data are to be stored in the optical disk device 22, the operator gives a linking instruction to the processor 12. More specifically, when a patient's name (patient code) and an imaged region, for example, are entered as linking conditions for related image data, then the processor 20 browses the magnetic disk device 20. If there are found corresponding retrieval data, then the display unit 18 displays the found retrieval data. The operator confirms the relationship between the image data corresponding to the displayed retrieval data and the new image data, and instructs the processor 12 to link these image data. More specifically, the retrieval record number (one of the image numbers A through Z in FIG. 2) of the related image data is recorded as link information in the region 6a of the retrieval data corresponding to the new image data. The retrieval record number (one of the image numbers A through Z in FIG. 2) of the new image data is recorded as link information in the region 6b of the retrieval data corresponding to the related image data.

For example, it is assumed that the image data C are related to the image data D. If a linked input instruction is given to the processor 12, the processor 12 records the retrieval record number "C" of the image data C as link information in the region 6a for the image data D, and also records the retrieval record number "D" of the image data D as link information in the region 6b for the image data C.

Figure 3A:
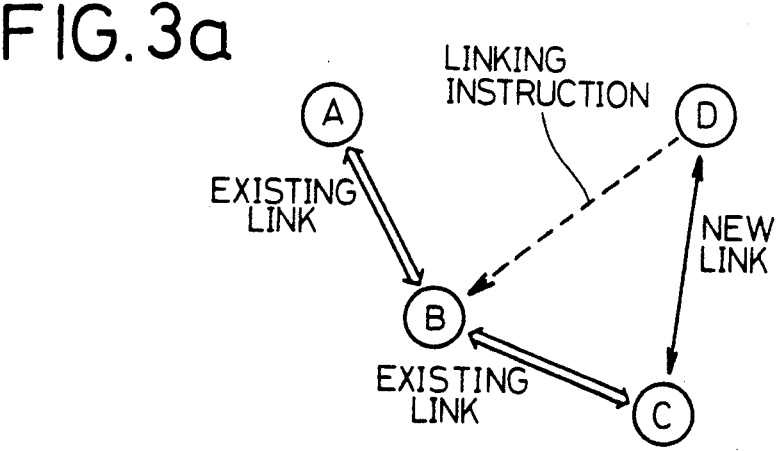
FIGS. 3a, 3b, and 3c are diagrams illustrative of the manner in which link information between related image data is specified.
Figure 3B:
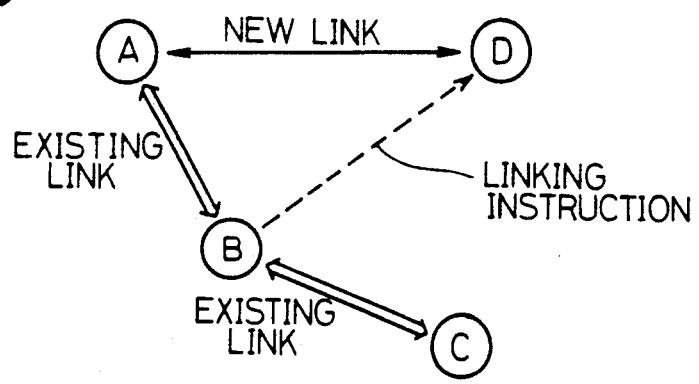
Figure 3C:
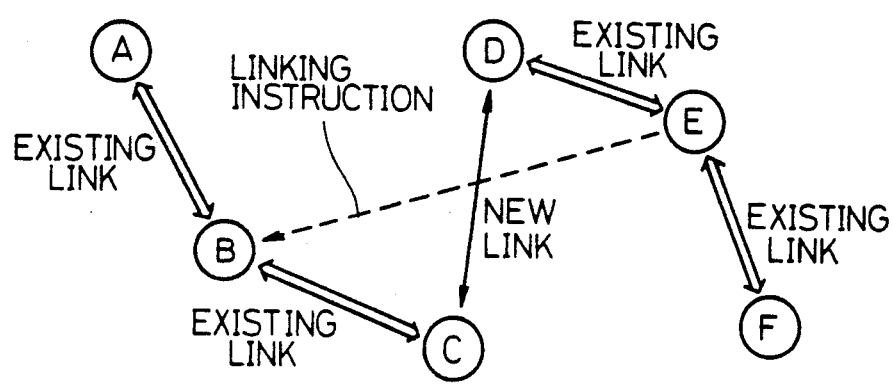

If link information has already been recorded between the retrieval data corresponding to related image data and these related data are to be linked to other new image data, then the processor 12 records link information in the regions 6a, 6b of the retrieval data corresponding to the new image data and the related image data according to the rules shown in FIGS. 3a through 3c.

As shown in FIG. 3a, when a linking instruction is given to link image data D to image data B, if the image data B are intermediate between image data A, C which are already been linked to the image data by link information, then the processor 12 records such link information that the image data D are linked to the final image data C of the linked image data.

As shown in FIG. 3b, when a linking instruction is given to link image data B to image data D, if the image data B are intermediate between image data A, C which are already been linked to the image data by link information, then the processor 12 records such link information that the image data D are linked to the first image data A of the linked image data.

As shown in FIG. 3c, when a linking instruction is given to link intermediate image data E of already linked image data D, E, F to intermediate image data B of already linked image data A, B, C, the processor 12 records such link information that the first image data D of the linked image data D, E, F are linked to the final image data C of the linked image data A, B, C.

When desired retrieval conditions such as a patient's name (patient code) and an image region are entered from the keyboard 14, the processor 12 browses the retrieval data stored in the magnetic disk device 20, and outputs the retrieval data with respect to corresponding image data to the display unit 18. The operator then specifies desired data, e.g., image data A, from the retrieval data displayed on the display unit 18, and transmits a selection signal from the keyboard 14 to the processor 12. The processor 12 accesses the optical disk device 22, and either displays the image data A indicated by the directory "A4" of the selected retrieval data on the display unit 18 or outputs the image data A as a hard copy from the printer 16.

When the operator gives a linked output instruction to the processor 12 to read related image data linked by the link information "A6a", "A6b" while desired image data are being retrieved, if the image number of the related image data is recorded as the link information "A6a", "A6b" in the retrieval data, then the processor 12 reads the retrieval data corresponding to the related image data linked by the image number, from the magnetic disk device 20, thereby obtaining the directory "A4" for the related image data. Based on the directory "A4", the processor 12 reads the related image data from the optical disk device 20 and stores the related image data in the magnetic disk device 20. After the desired image data are outputted, the operator can instruct the processor 12 to read the related image data from the magnetic disk device 20, and either displays the related image data on the display unit 18 or outputs the related image data as a hard copy from the printer 16. Since the related image data are not read from the optical disk device 22 but read from the magnetic disk device 20 at this time, the image data related to the desired image data A can be obtained at high speed.

With the present invention, when desired image data specified by the corresponding retrieval data are outputted, image data related to the desired image data can simultaneously be read out on the basis of link information. Consequently, the related image can quickly and efficiently be retrieved and outputted.

Although a certain preferred embodiment has been shown and described, it should be understood that many changes and modifications may be made therein without departing from the scope of the appended claims.

What is claimed is:

1. An image filing system comprising:
   a first image storage device for storing image data representing a plurality of images;
   a second erasable random-access image storage device for storing image data;
   a retrieval data storage device for storing retrieval data corresponding to the image data stored in said first image storage device, said retrieval data including storage location information of said image data in said first image storage device and key information to retrieve the image data; and
   processing means for specifying image data according to corresponding retrieval data, and for either reading the specified image data from said first image storage device for reproduction, or transferring the specified image data from said first image storage device to said second image storage device and reading the transferred specified image data from said second image storage device for reproduction;
   wherein said processing means comprises a first means for adding link information to the retrieval data corresponding to the specified image data, said link information representing other, related image data relative to the specified image data, which other, related image data need not have been recorded consecutively with said specified image data but which nevertheless is related to said specified image data, and a second means for determining the image data related to the specified image data according to the link information and transferring the determined image data from said first image storage device to said second image storage device.

2. An image filing system according to claim 1, wherein said link information comprises first link data for specifying related image data recorded prior to said specified image data and second link data for specifying related image data recorded subsequently to said specified data.